UNITED STATES PATENT OFFICE.

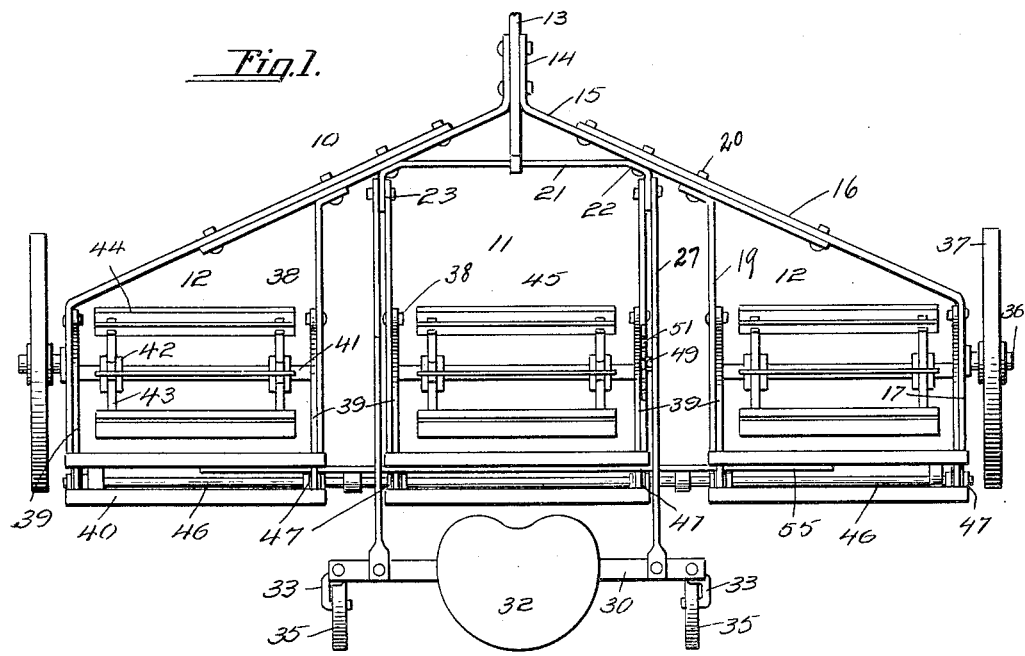

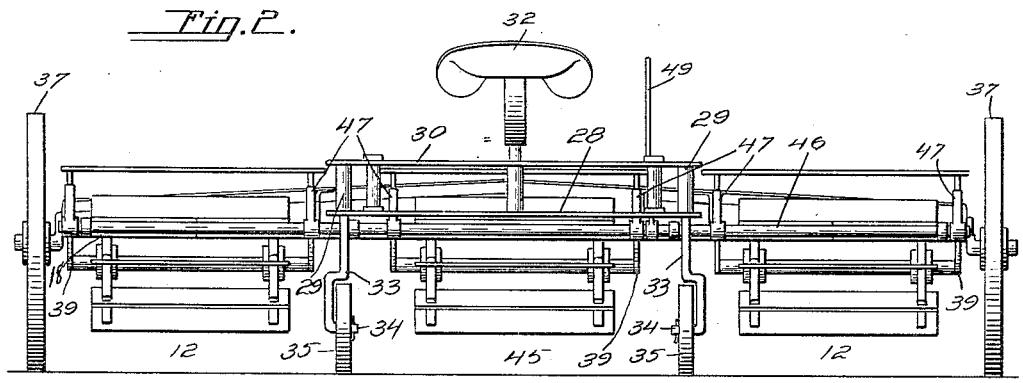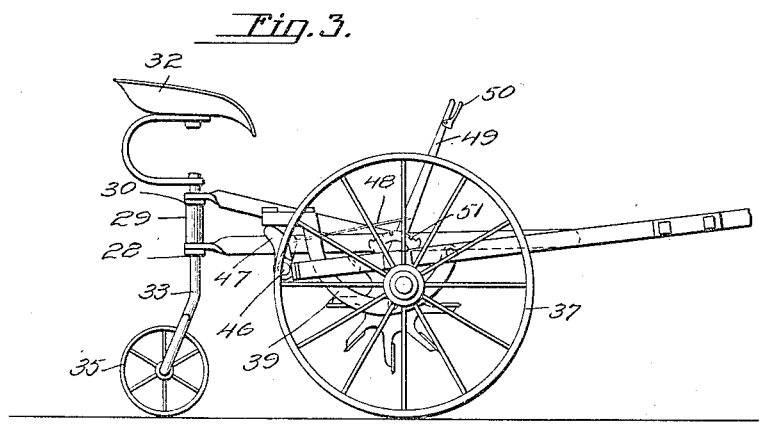

JOHN WARREN McHAM, OF PARIS, TEXAS.

FARMING IMPLEMENT.

1,287,374. Specification of Letters Patent. Patented Dec. 10, 1918.

Application filed February 23, 1918. Serial No. 218,767.

*To all whom it may concern:*

Be it known that I, JOHN W. McHAM, a citizen of the United States, residing at Paris, in the county of Lamar and State of Texas, have invented new and useful Improvements in Farming Implements, of which the following is a specification.

This invention relates to agricultural implements, and particularly to frames therefor.

In carrying out my invention it is my purpose to provide an agricultural implement with a frame so constructed and arranged as to accommodate, side by side, a plurality of implements so that the same can perform their work in unison, and so that a large amount of work can be accomplished in a comparatively small amount of time.

It is also my purpose to produce a farm implement including a frame designed to carry a plurality of implements which is adjustable to accommodate various widths and sizes of implements, and which is provided with means whereby the same may be readily attached or detached from the implements.

It is a further object of the invention to produce an adjustable frame for farm implements which shall be of a simple and cheap construction, but which shall also be strong and durable and thoroughly efficient for the purpose designed.

Other objects and advantages will appear as the nature of the invention is better understood, reference being had to the accompanying drawings, in which, Figure 1 is a top plan view illustrating the improvement in connection with a stalk cutter.

Fig. 2 is a rear elevation of the same.

Fig. 3 is a side elevation of the same.

In the drawings I have shown the improvement in connection with an ordinary construction of stalk cutters, three sets of which being employed. The frame, except in minor details which will hereinafter be alluded to is of a similar construction throughout and while I have illustrated in connection therewith certain classes of farming implements, it is to be understood that the same is not to be restricted in its application to the implements thus illustrated, but may be employed in connection with various other forms of implements where it is desired that a comparatively great amount of work be accomplished in a limited time by the employment of draft animals, or other propelling means which, under ordinary conditions, would form the motive power for only a single machine.

The frame is preferably constructed of a plurality of metal bars which are comparatively light but which are strong and effective. The frame is designed to have journaled thereon three separate axles or shafts each having connected thereto or journaled thereon a farming implement, and in reality the main frame 10 comprises a central auxiliary frame 11 and end auxiliary frames 12 arranged to the opposite sides of the frame 11.

The main frame includes a pole 13 to which the draft animals or other propelling means are hitched. To the pole 13, adjacent to the inner end thereof are secured angle ends 14 of the front bars 15 of the frame 10. The connecting means between the pole 13 and the angle ends 14 of the front bars 15 in the showing of the drawings, comprise bolt and nuts, the said bolts passing through alining openings in the said members and as the pole may be provided with a greater number of openings than the end of the members 15 the pole may be thus adjustably connected to the front bars 15. The bars 15 are arranged at opposite angular directions with respect to the pole 13 and have adjustably secured, upon their outer faces the front bars 16 for the end frames 12. The connection between the bars 15 and 16 is in the nature of nuts and bolts, but the openings in the said bars are so arranged that certain of the same may be brought to alinement to receive the bolts, so that the front bars 16 may be thus longitudinally adjusted upon the front bars 16 of the main frame 10. The bars 16, at their outer ends are bent upon themselves to provide angular extensions 17, the latter being further bent to provide inwardly extending right angular members 18 and the said members 18 form the rear portions of the frames 12. The rear or back plates 18 are further bent to provide right angular members 19 extending parallel with the members 17, the said members 17 providing, of course, the outer sides of the frame 12, the members 19 providing the inner sides of the said frames. The inner sides 19 have their ends arranged at an outward angle as indicated by the numeral 20 and these angular portions are adjustably connected to both the bars 15 and the front bars 16 of the frames 12. The connection between the members 20 and the front bars of the main and end frames is in the nature of nuts and bolts, the said bolts passing through certain of the referred to openings in the said bars 15 and 16.

The front bar for the center auxiliary frame 11 is indicated by the numeral 21. This bar 21 passes through a suitable opening in the pole 13 and is provided, adjacent its ends with angle portions 22 that contact with the inner faces of the bars 15 and connected to the said bars 15, as well as to the front bars 16 of the frames 12 by removable and adjustable elements, nuts and bolts being shown in the drawings. The front bar 21, outward of its angle portions 22, is bent to provide rear extensions 23 and upon the inner sides of these extensions 23 are pivotally secured, as at 24 the side members 25 of the frame 11. These side members are, in the showing of the drawings, integrally formed with the rear member 26 of the said frame 11. Thus the sides and rear are constructed of a substantially U-shaped member. Connected by the pivots 24, to the outer sides of the extensions 23 are rearwardly arranged bars 27 which extend a suitable distance beyond the rear of the frame. These bars 27 have secured, to their outer ends, a cross bar 28, and upon the bar 28, adjacent the ends thereof are secured sleeves 29 which support an upper cross bar 30. To the bar 30 are secured rods 31 that may be welded or otherwise secured to the bars 27. Suitable pivot or other connecting members pass through the sleeves 29 connecting the same to the bars 28 and 30. On the upper bar 30 is secured the driver's seat 32, and journaled in the sleeves 29 are the upper ends of the rods 33 which have their lower ends offset to provide axles 34 for wheels or rollers 35 that support the rear of the frame.

On the outer sides of the end frame 12 are secured trunnions which provide axles 36 for the ground wheels 37. Pivotally secured, as at 38 to the sides of the center and end frames 11 and 12 respectively, are the arched side members or arms 39 of a substantially rectangular tilting frame 40. The arms 39 are provided with boxes or other bearings for shafts 41, one of said shafts being carried by each of the tilting frames 40, and upon each of the said shafts is secured hubs 42 from which radiate spokes 43, to which latter are secured the cutting blades 44 of the stalk cutters 45. The outer and upper members of the tilting frames 40 are designed to have weight arranged thereon whereby to tilt the outer ends of the side frames to normally swing the same downwardly and consequently bring the cutting blades 44 of the stalk cutters 45 near the ground. To regulate the adjustment of the stalk cutters with respect to the ground, I journal in suitable bearings to the rear of the frame 10 a shaft 46 provided with a plurality of upstanding cam arms 47, and these arms are designed to underlie the spread upper portions of the tilting frames 40. To one of the cam members 47 arranged between the sides of the center frame 11 is secured a link 48 connected with a lever 49 suitably pivoted to the side of the frame 11. The lever is provided with a spring pressed pawl actuated by a hand grip 50 pivoted to the lever 49, the said pawl engaging with the teeth of a rack 51 secured to one of the sides of the frame 11. The lever 49 is arranged in close proximity to the seat 31, so that the same may be readily grasped by the driver to actuate the pawl and swing the cam members to tilt the frames 40 and consequently adjust the stalk cutters 11 with respect to the ground surface.

From the construction and arrangement as above described, it will be noted that the auxiliary frames may be adjusted longitudinally with respect to each other so as to accommodate farming implements of different widths and also to permit of farming implements of the same width being properly spaced away from each other to best accommodate the implements to act on the different vegetation or surfaces, and from the foregoing description, when taken in connection with the drawings, the simplicity and advantages of the construction, it is thought, will be apparent without further detailed description.

What I claim is:

1. In a device for the purpose set forth, a pole, angularly arranged bars secured to the sides of the pole adjacent the end of the said pole, a center frame secured to said bars and to the end of the pole, end frames including angle front portions adjustably connected to the bars, each of the frames having journaled thereon alining axles carrying implements, trunnions on the end frames providing short shafts and ground wheels journaled on said shafts.

2. In a device for the purpose set forth, a pole, oppositely arranged angle bars secured to the sides of the pole between the ends thereof, a substantially rectangular center frame secured to the pole and to the said bars, substantially rectangular end frames adjustably and removably secured to the bars, short shafts on the end frames, ground wheels journaled on said shafts, alining shafts journaled in all of the frames and each carrying an implement, and a bar adjustably connecting the frames at the rear thereof.

3. In a device for the purpose set forth, a pole, a frame secured thereon, frames arranged to the sides of the first mentioned frame and adjustably connected therewith, ground wheels journaled on the last mentioned end frames, alining shafts journaled on each of the frames and an implement carried by each of said shafts, a bar adjustably connecting the frames at the rear thereof, longitudinally extending bars connected to the center frame and extending rearwardly therefrom, bars connected with the center frame and extending rearwardly thereof, angle bars secured to the last mentioned bars, bars connected to the ends of the first mentioned bars, spacing means between said connecting bars, vertically disposed rods depending from said connecting bars and having their ends offset to provide axles, wheels journaled on said axles, and a seat upon the other connecting bar.

4. In a device for the purpose set forth, a plurality of substantially rectangular adjustably connected frames, ground wheels on the end frames, tilting frames having arched side members which are pivotally secured to the sides of the first mentioned frames, shafts journaled in the tilting frames and each having an implement secured thereto, a longitudinally arranged shaft journaled on the first mentioned frames, cam members secured to the said shaft and arranged beneath the tilting frames, a pivoted lever on one of the frames, a link connection between said lever and one of the cam members, a spring pressed pawl carried by the lever, and a segment secured on one of the frames and engaged by the pawl.

In testimony whereof I affix my signature.

JOHN WARREN McHAM.